(12) United States Patent
Bonn

(10) Patent No.: US 7,995,117 B1
(45) Date of Patent: Aug. 9, 2011

(54) METHODS AND SYSTEMS FOR ASSOCIATING AN IMAGE WITH A LOCATION

(75) Inventor: Mark J. Bonn, Granite Bay, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 498 days.

(21) Appl. No.: 12/060,313

(22) Filed: Apr. 1, 2008

(51) Int. Cl.
*H04N 5/76* (2006.01)
*G01C 21/00* (2006.01)

(52) U.S. Cl. .................................... 348/231.3; 701/207

(58) Field of Classification Search ................. 348/158, 348/221.1, 221.2, 221.6, 231.2, 231.5, 231.6, 348/94, 107; 701/207, 213, 214
See application file for complete search history.

(56) References Cited

U.S. PATENT DOCUMENTS

| | | | |
|---|---|---|---|
| 2008/0229248 A1* | 9/2008 | Fagans et al. | 715/838 |
| 2009/0094289 A1* | 4/2009 | Xiong et al. | 707/200 |
| 2010/0118025 A1* | 5/2010 | Smith et al. | 345/418 |

* cited by examiner

*Primary Examiner* — Lin Ye
*Assistant Examiner* — Trung Diep

(57) ABSTRACT

There is disclosed herein a method for associating a location with an image captured by an image capture device, wherein the method comprises capturing an image, determining a first location of the device in response to capturing the image, storing the first location in association with the image, determining a second location of the communication device subsequent to storing the first location in association with the image, and storing the second location in association with the image.

14 Claims, 6 Drawing Sheets

METHODS AND SYSTEMS FOR ASSOCIATING AN IMAGE WITH A LOCATION

TECHNICAL BACKGROUND

Wireless technologies have led to the development of many new services such as location determination services.

Location determination can be accomplished with differing methods and systems and with varying levels of accuracy and speed. Some of the less precise methods of determining locations include time of arrival, time difference of arrival, angle of arrival, forward link trilateration, advanced forward link trilateration, enhanced forward link trilateration, observed time difference, over-the-air serving sector latitude and longitude, and enhanced observed time difference of arrival, amongst others. Each of these methods involves use of wireless signals broadcast by a wireless network to calculate a position.

More precise methods to determine a location involve receiving signals broadcast by the Global Positioning Satellite (GPS) system and then using those signals to determine a location. The use of four of the twenty-four GPS satellites is required to determine a position with accuracy. Since acquisition of such GPS signals may take some time and because the subsequent calculations to determine a position can be lengthy, GPS determined locations often take a greater time than the less precise methods do. Two techniques for determining locations using this technology are known in the art as GPS and assisted GPS.

Location determination can be made using individually or some combination of hardware/firmware/software installed in a wireless network, in a mobile device, or both. The less precise methods are typically network based and do not require changes in the hardware/firmware/software of a mobile device, though base stations may require such. Wireless device or handset based services typically will require some combination of hardware/firmware/software to be able to determine a location.

Once a location is determined, that information can be manipulated or used by a wireless device to provide a location in association with the use of its myriad other functionalities, including but not limited to telephone call placement and reception, location based services such as but not limited to providing directions to or from a location, and image capture. For example, it is presently known to label a photograph with a location that has been determined by a location determination system such as one of those previously mentioned.

OVERVIEW

There is disclosed herein a method for associating a location with an image captured by an image capture device, wherein the method comprises capturing an image, determining a first location of the device in response to capturing the image, storing the first location in association with the image, determining a second location of the communication device subsequent to storing the first location in association with the image, and storing the second location in association with the image.

There is further disclosed herein a location determination system for an image, said system comprising an image capture device for capturing an image, a user interface linked to the image capture device, and a computer system linked to the interface and to the image capture device. The computer system comprises a communication interface and a processing system linked to the communication interface and configured to receive the image captured from the image capture device, store the received image, determine a first location of the image capture device in response to receiving the image, store the first location in association with the image, determine a second location of the image capture device, and store the second location in association with the image.

DETAILED DESCRIPTION

Figure 1:
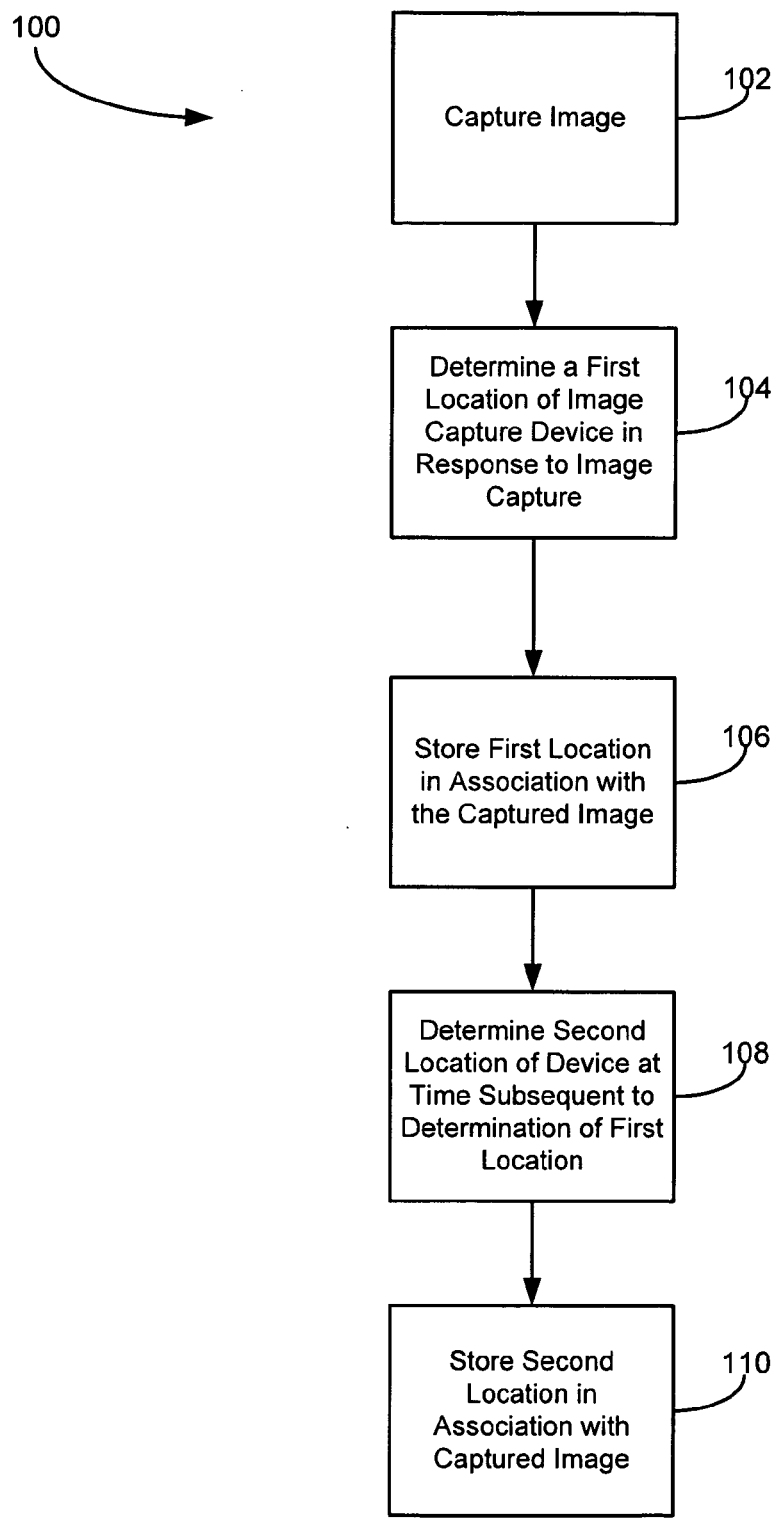
FIG. 1 is a diagram illustrating an embodiment of method in accord with the disclosure herein.

Many aspects of the disclosure can be better understood with reference to the accompanying drawings. The components in the drawings are not necessarily to scale, emphasis instead being placed upon clearly illustrating the principles of the present disclosure. Moreover, in the drawings, like reference numerals designate corresponding parts throughout the several views, though for purposes of clarity in describing specific figures different reference numbers may be used for the same functional component or step. While several embodiments are described in connection with these drawings, there is no intent to limit the disclosure or the scope of the claims to the embodiment or embodiments disclosed herein. On the contrary, the intent is to cover all alternatives, modifications, and equivalents, even if not explicitly or implicitly disclosed herein.

Referring to FIG. 1 a method 100 for associating a location with an image is disclosed. Method 100 comprises capturing an image with an image capture device at step 102. Examples of image capture devices that may find use with method 100 include wireless mobile devices like cellular telephones. After the image is captured, it will be stored in an appropriate electronic memory, typically in the device that captured the image. In response to the image being captured, a first location of the image capture device will be determined at step 104 and that location will be stored in association with the captured image in any known manner at step 106. Typically, the first location will be determined simultaneously or nearly so with the image capture. To ensure the greatest possible accuracy in the first location relative to the image capture, the first location should be determined within a predetermined time period of when the image is captured.

Subsequently, it may be possible to determine a more exact location for the image capture device near to the time and location at which the image was captured. In such a circumstance, a second location for the image capture device can be determined at step 108 and then that location can be stored in association with the captured image in any known manner at step 110.

The most precise method of location determination may be used, including use of GPS or advanced GPS. Often, however, such as when an image is captured indoors, underground, or in so-called urban "canyons" of tall buildings, GPS signals may not be available to determine a location because of the inability of the signals to penetrate structures or the ground. In such circumstances, other less precise methods, such as those mentioned previously—including time of arrival, time distance of arrival, angle of arrival, advanced forward link trilateration, enhanced forward link trilateration, and enhanced observed time difference of arrival, over-the-air serving sector latitude and longitude, amongst others—can be used to determine the location of the device in response to the image capture and, hence, the general location that the image was captured within the limits of precision of the particular method used. This location information can be subsequently stored in association with the stored image at step 106.

The location information can be stored using multiple methods. For example, the information could be embedded directly in the image itself. The location information could be stored as part of the image file name or as part of the data forming the image for subsequent retrieval and display or even made part of the visible image in the same manner that images are visibly "date-stamped". Alternatively, the information could be stored in a relational database along with the image file name and retrieved as desired. The present embodiment is not limited to a particular manner or apparatus in storing the location information in association with the image. In yet another example, the information could be stored in the file properties associated with the image file. Other ways of storing the location information are possible.

Furthermore, the image capture device may be a mobile wireless device such as a cell phone having the ability to capture images or a camera that is provided with wireless capabilities, including that of location determination. In addition, the present embodiment is not limited to images captured only digitally, but also encompasses those captured on film or in any other manner. The present embodiment is not limited to storage of the image and location information within the image capture device itself, but includes storage of the captured image and location information in other storage devices connected to the wireless device by either a wired or wireless connection.

Yet another image capture device useful with the embodiment shown in FIG. 1 is a closed circuit television (CCTV) camera such as those found on transportation systems, for example, busses and train cars. A CCTV camera may be connected to a central computer system at a headquarters by a wireless connection or may be connected either wirelessly or by a wired connection to a storage device located on the bus or train car itself. This would enable the locations of specific events—such as criminal acts or medical emergencies—that otherwise went unnoticed by a bus driver or train operator to be determined.

As noted above, location determinations using methods such as time of arrival, time distance of arrival, angle of arrival, advanced forward link trilateration, enhanced forward link trilateration, and enhanced observed time difference of arrival, over-the-air serving sector latitude and longitude, amongst others, are imprecise. For example, while time distance of arrival techniques can calculate distances with a resolution in the hundreds of meters, GPS determinations are accurate to within meters or fractions thereof.

Figure 2:
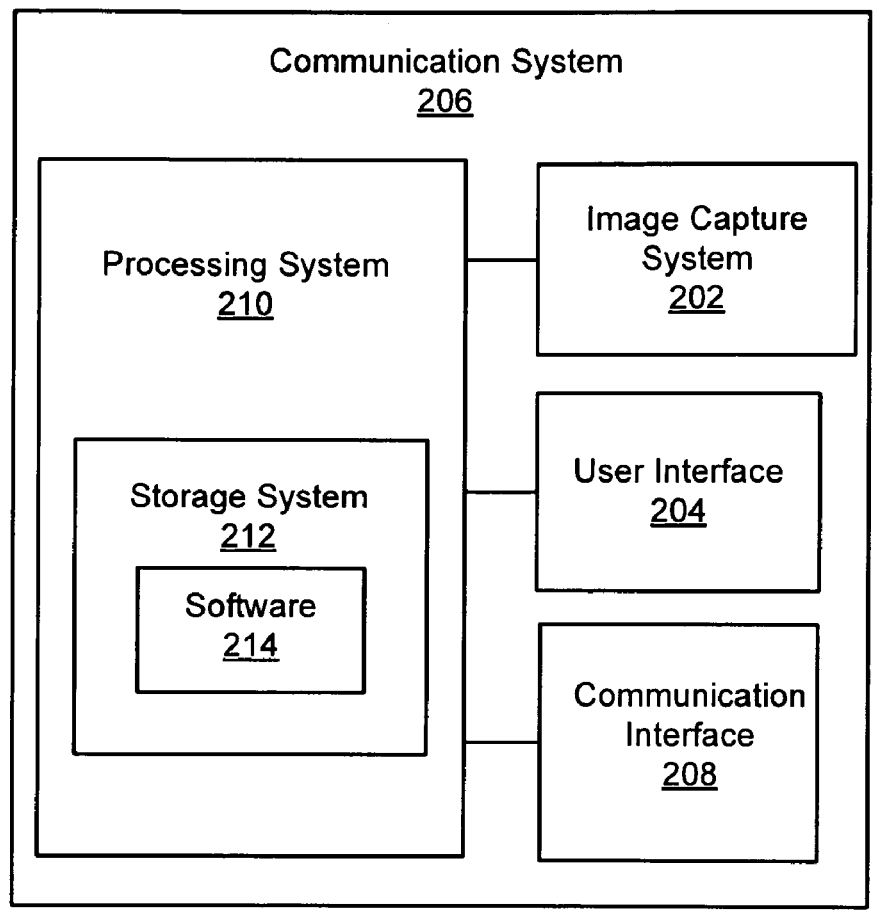
FIG. 2 is a diagram of a system in which an embodiment in accord with the disclosure herein may be implemented.

Referring now to FIG. 2, communication system 206 in which the disclosures herein may be implemented is illustrated. Communication system 206 may be a self-contained unit such as known wireless devices, including but not limited to cellular telephones or cameras that include or are linked in known manner to wireless technologies, such as wireless device 302 shown in FIG. 3. Communication system 206 includes image capture system 202, user interface 204, communication interface 208 and processing system 210. Processing system 210 includes storage system 212. Storage system 212 stores software 214. Processing system 210 is linked to communication interface 208, image capture system 202, and user interface 204. Communication system 206 could be comprised of a programmed general-purpose computer, although those skilled in the art will appreciate that programmable or special purpose circuitry and equipment may be used, such as those found in wireless devices. Communication system 206 may be distributed among multiple devices that together comprise elements 210-214.

Communication interface 208 could comprise a network interface, modem, port, transceiver, or some other communication device. Communication interface 208 may be distributed among multiple communication devices. Processing system 210 could comprise a computer microprocessor, logic circuit, or some other processing device. Processing system 210 may be distributed among multiple processing devices. User interface 204 could comprise a keyboard, voice recognition interface, microphone and speakers, graphical display, touch screen, or some other type of user device. User interface 204 may be distributed among multiple user devices. Storage system 212 could comprise a disk, tape, integrated circuit, server, or some other memory device. Storage system 212 may be distributed among multiple memory devices.

Processing system 210 retrieves and executes software 214 from storage system 212. Software 214 may comprise an operating system, utilities, drivers, networking software, and other software typically loaded onto a computer system. Software 214 could comprise an application program, firmware, or some other form of machine-readable processing instructions. When executed by processing system 210, software 214 directs processing system 210 to operate as described herein for a communication system, such as wireless device 302.

The embodiment of FIG. 1 may be implemented by communication system 206 as previously noted. Communication system 206 may comprise a wireless mobile device such as a commonly known cellular telephone handset. Such handsets typically incorporate a camera or image capture device 202. They also include a user interface 204 including a number pad and display. Finally, they include a computer system that includes a processing system 210 comprising a storage system 212 and software 214. The processing system 210 of a handset will be operationally connected to a communication interface 208 enabling it to communicate with a cellular network or GPS satellites.

Operationally, the handset camera may be used to take a photo of a particular scene with the image being stored in the storage system 212. Thereafter the location of the handset may be determined using the communication interface 208 thereof. This location can then be stored in the storage system 212 in association with the photo or image as previously described.

Alternatively to a wireless device such as a cellular telephone, a device that does not include voice communication capabilities could also be used to implement FIG. 1. For example, a digital or film camera could be equipped with the necessary communication interface and computer system 206 to allow it to access a cellular network and/or the GPS satellite system and access location determination systems. This would enable the higher quality photographs taken with a 35 mm camera, or large format camera, by way of example and not limitation, to associate a location with an image.

Figure 3:
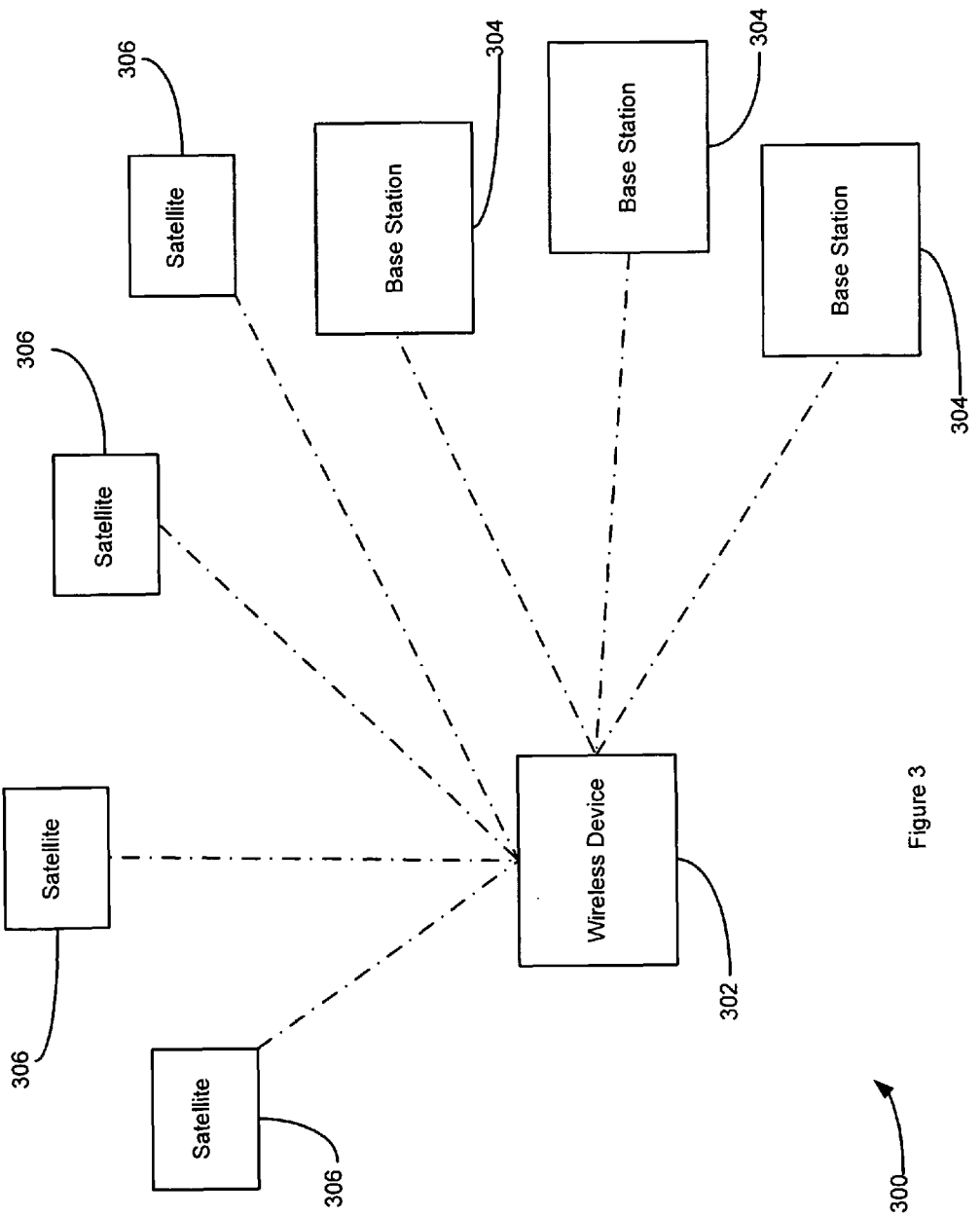
FIG. 3 schematically illustrates a wireless communication system

Referring to FIG. 3, a wireless communication system 300 is illustrated. As seen there, a wireless device such as a cellular telephone handset 302 (or as noted previously, a digital or film camera, for example) is in communication with a plurality of base stations 304 as well as GPS satellites 306. When a wireless device transmits a signal, that signal is typically received by multiple base stations 304. By determining the length of time that the signal travels, each base station can determine an approximate distance between the base station and the device 302, which enables a calculation of the approximate location of the device 302. Similarly, the difference in time of the arrival of the signals at the base stations as well as the direction from which the signal arrived can be used to calculate an approximate location. Various methodologies for determining a location using these techniques are well-known in the art.

Alternatively, as noted previously, a device 302 may include the necessary software and hardware to receive signals from GPS satellites 306 and use those signals to calculate a location, also using techniques well-known to the art.

Figure 4:
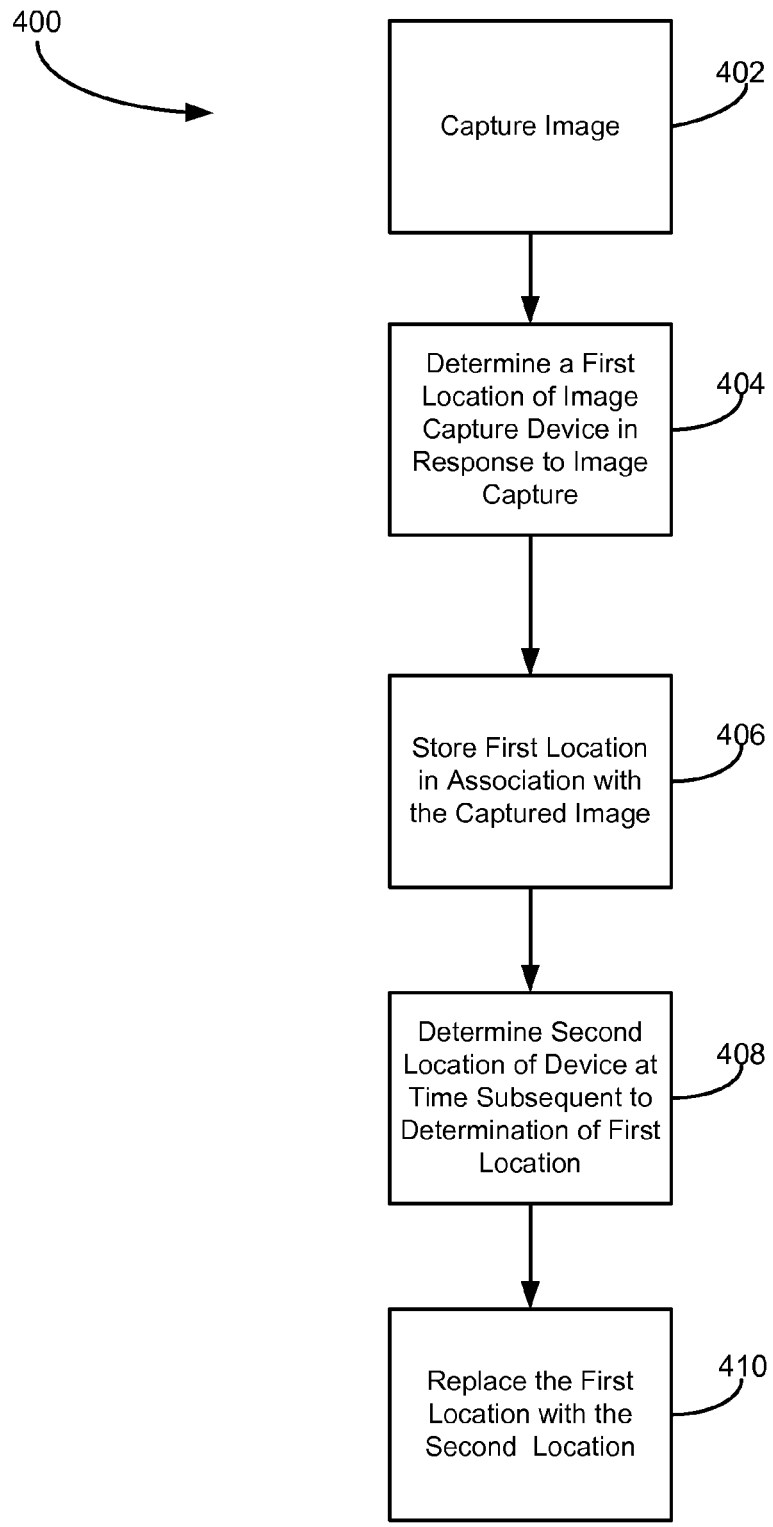
FIG. 4 is a diagram illustrating another embodiment of a method in accord with the disclosure herein.

FIG. 4 illustrates another embodiment 400 of a method in accord with the disclosure herein. The embodiment of FIG. 4 comprises capturing an image with an image capture device at step 402. In response to the image being captured, a first location of the image capture device will be determined at step 404 and that location will be stored in association with the captured image in any known manner at step 406.

Subsequently, it may be possible to determine a more exact location for the image capture device near to the time and location at which the image was captured and the first location acquired. In such a circumstance, a second location for the image capture device can be determined at step 408 and that location can be stored in association with the image in replacement of the first location at step 410.

Figure 5:
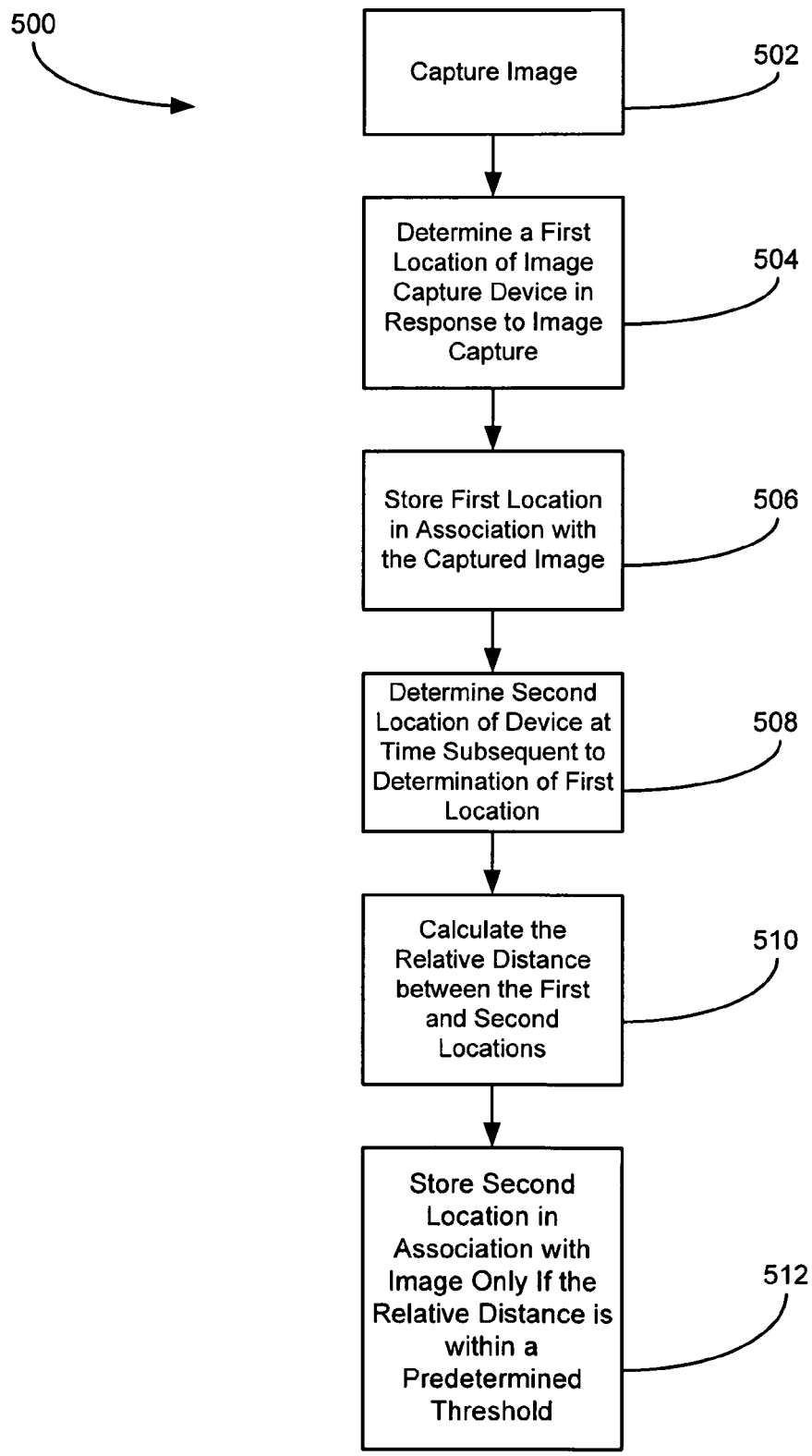
FIG. 5 is a diagram illustrating another embodiment of a method in accord with the disclosure herein.

FIG. 5 illustrates another embodiment 500 of the disclosure herein. In certain circumstances it may not be desirable to store the second location or to replace the first location with the second. Such a circumstance could arise where the image capture device was turned off shortly after the first location was determined and a second location not determined until the device was a substantial distance from the first location when once again turned on. For example, an individual may take pictures inside a chapel with a cellular phone of a wedding party where GPS signals are not being received. A location of the phone can be determined using other, less exact methods and that location stored in association with the image. Subsequently, the phone may be off to avoid a disruption of the ceremony or for some other reason.

If the phone owner neglects to turn the phone on again until later at the wedding reception, which may be miles from the wedding chapel, determination of the second location is unlikely to be more precise than the first location. In such a circumstance, the second location determination should not be automatically associated with the image nor replace the first location in association therewith. A thresholding check is desirable to ensure as likely as possible the greatest accuracy in the location ultimately associated with the image.

Thus, referring to FIG. 5, the method 500 of FIG. 5 comprises capturing an image with an image capture device at step 502. In response to the image being captured, a first location of the image capture device will be determined at step 504 and that location will be stored in association with the captured image in any known manner at step 506.

As with the foregoing embodiments, a second location for the image capture device can be determined at step 508. However, prior to storing the second location in association with the image, the relative distance between the first and second locations will be calculated at step 510. If it should be determined that the second location is within a predetermined distance from the first location, the second location will be stored in association with the image at step 512. If not, the second location can be selectively discarded or stored.

The predetermined threshold for rejecting the second location can be variously established. One method would be to determine a threshold distance based upon a predetermined multiple of the margin of error used in determining the first location. For example, if the margin of error in the calculation method for the first location is 100 meters, the second location may be stored if it is within a predetermined multiple of that margin of error. If not, the operator of the image capture device could be provided with an option to store the second location or to discard it.

Figure 6:
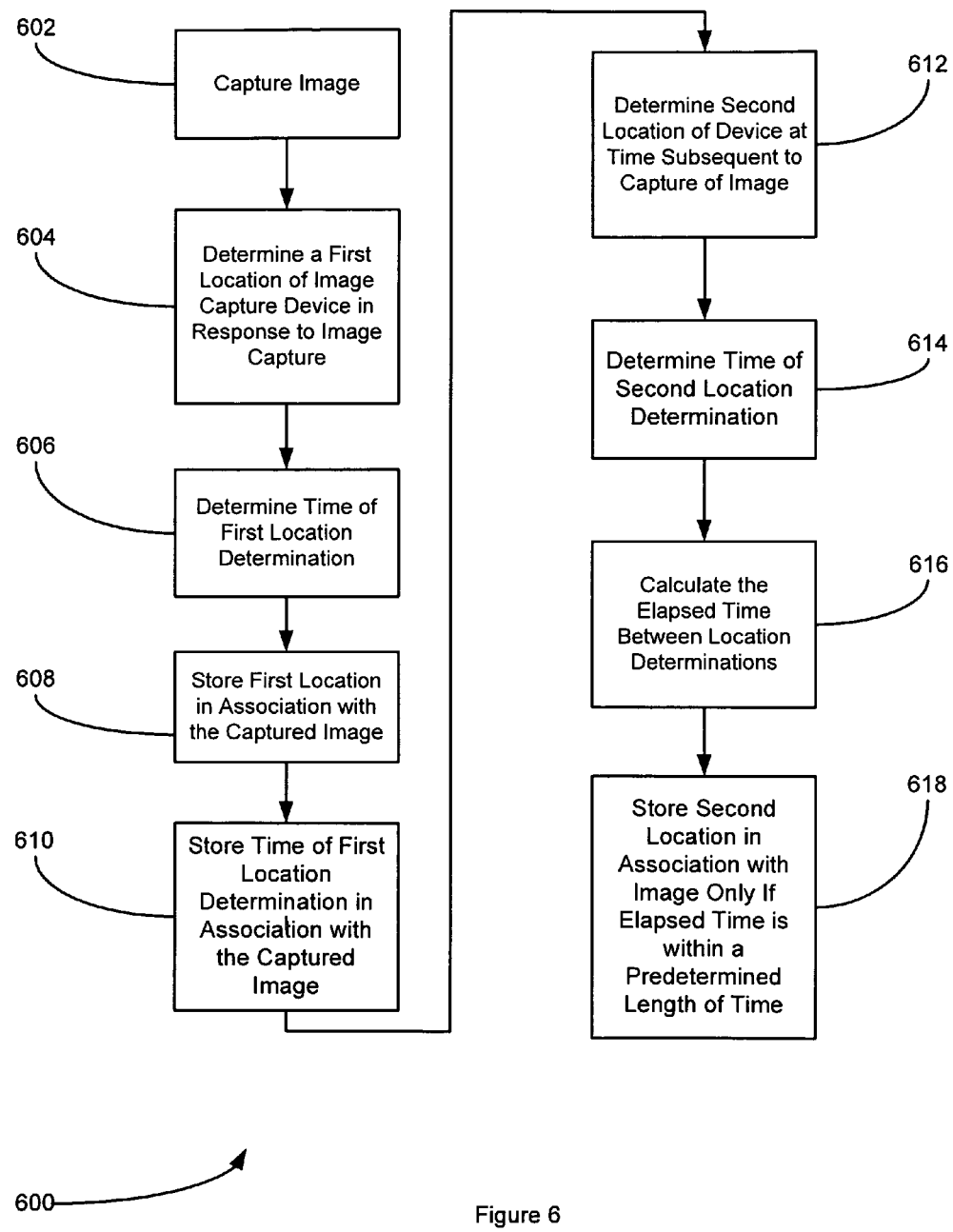
FIG. 6 is a diagram illustrating another embodiment of a method in accord with the disclosure herein.

FIG. 6 illustrates another embodiment 600 of the disclosure herein. As noted above, in certain circumstances it may not be desirable to store the second location or to replace the first location with the second. Such a circumstance could arise when the second location is not determined within a predetermined time of the first location determination. That is, a delay in determining a second location can be treated presumptively as an indicator of the unreliability of the determination of the second location.

As with the first example given with regard to FIG. 6, an image capture device may be selectively switched off before the second location is determined and not switched on again until much later. Even though a second location could be determined after the device was turned on, the device may have traveled hundreds or thousands of miles from when the first location was determined. Consequently, it would not be desirable to store the second location or replace the first location with the second. In such a circumstance, the second location determination should not be automatically associated with the image nor replace the first location in association therewith. A thresholding check is desirable to ensure as likely as possible the greatest accuracy in the location ultimately associated with the image.

Referring to FIG. 6 again, method 600 comprises capturing an image at step 602. The location of the image capture device is determined at step 604 in response to the image capture. Substantially the determination of the first location, the time that determination is achieved will also be determined at step 606. The first location will then be stored in association with the image at step 608 and the time that the first location was determined will also be stored in association with the image at step 610.

A second location of the image capture device will be determined at step 612 and the time that the second location is determined will be itself determined at step 614. The two times will be determined at step 616 to determine the amount of time that has elapsed between the two location determinations. If the elapsed time does not exceed a predetermined threshold, then the second location can be stored in association with image or replace the first location as at step 618. If the threshold is exceeded, the image capture device operator can be provided with the option of storing the second location information regardless or discarding it.

As an alternative to determining the time that the first location was determined, the time that the image was captured can be used. That is, many image capture devices already include well known means for determining the time an image was captured. This time is often embedded within the image file or is made visible when the image is displayed or printed. This time can be readily used in lieu of determining independently the time that the first location was determined. No such alternative exists for the second location determination because it cannot be assumed that any image that may be captured at that point in time is related to another image geographically except as described below.

The present embodiments further include determining only a single first location where multiple images are captured within a predetermined time frame. For example, many image capture devices are able to capture multiple images in a rapid manner and within varying periods of time. In such a circumstance, a single first location could be determined for the multiple images and compared with a single second location determined later. Using a single first location and a single second location in the embodiments disclosed herein will reduce the number of calculations in the device processors, thereby reducing the power consumption of the device and prolonging battery life.

Another example where storing the second location or replacing the first location with the second location may not be desirable is when more accurate methods for determining a location than were used to determine the first location are not available for a predetermined period of time. Thus, if the first location is determined using a method with a known margin of error and a predetermined period of time elapses before a more accurate location determination method becomes available, the storage of the second location can be made optional at the operator's choice. Thus, the threshold may not simply be an absolute time period elapsing between the first and second location determinations, but also a predefined time period elapsing between when a more accurate location determination method becomes available.

An example of the foregoing is in the so-called "urban canyon" or even a natural canyon. In both circumstances, GPS service availability may be intermittent if available at all. A presumption can be established where the passage of a predetermined period of time—shorter than the absolute period of time passage discussed earlier—during which such more accurate location determination methods are not available is itself indicative that a location determination made later with the more accurate method is less accurate than the first location determination. The user/operator can be provided with an option of storing the second location in association with the image or, if desired, can be defaulted to a store setting in the implantation of the embodiment.

The embodiments disclosed and discussed herein can be implemented in various manners. While it will generally be more desirable to use GPS or assisted-GPS techniques for determining the second location, individual users will have varying levels of concern about how accurate the location is. For example, one guest taking photographs inside a wedding chapel may be satisfied with a first location having an accuracy within 500 meters and second location having an accuracy within 200 meters while another may want the most precise measurement available with GPS or related location determination systems. Thus, any implementation of the embodiments herein may include options for a user to select a hierarchy of precision in the location determinations—and thus the methods used—and to thus select the level of accuracy desired. Furthermore, implementations may include options for the user to default to storing the second location always or to always be given the option of selecting whether the second location is stored in association with the image.

For example, if the latitude and longitude of the serving cell sector is used to determine the location, the latitude and longitude is known instantly from the various signaling messages a wireless device exchanges with the serving cell, even though the latitude and longitude is not very precise. However, this may be acceptable for a user someone only interested in knowing what images were shot in what city. Other methods require more time to acquire the location (such as AFLT, which requires about 4 seconds, and A-GPS, which presently requires 8-14 seconds). Thus, a user may desire to select latitude and longitude for his preferred level of accuracy.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for associating a location with an image, the method comprising:
   capturing an image with an image capture device;
   determining a first location of the image capture device in response to capturing the image;
   storing the first location in association with the image;
   determining a second location of the image capture device subsequent to storing the first location in association with the image, wherein the second location is closer to the location where the image was captured than is the first location; and
   storing the second location in association with the image.

2. The method of claim 1 wherein determining the first location occurs substantially at the time the image was captured.

3. The method of claim 1 further comprising replacing the first location with the second location.

4. The method of claim 3 wherein replacing the first location with the second location comprises removing the first location from the image and embedding the second location in the image.

5. The method of claim 1 wherein storing the first location with the image comprises at least one of the following techniques: embedding the first location in the image, associating the file name of the image with the first location in a relational database, or storing the location as part of the image file name.

6. The method of claim 1 wherein the image capture device is a wireless device.

7. The method of claim 1 wherein the second location is determined using at least one of the group of GPS and assisted GPS.

8. A communication system for associating a location with an image comprising:
   an image capture system configured to capture an image;
   a processing system coupled to the image capture system and configured to determine a first location of the communication system in response to capturing the image, storing the first location in association with the image, determining a second location of the image capture device subsequent to storing the first location in association with the image, wherein the second location is closer to the location where the image was captured than is the first location, and storing the second location in association with the image.

9. The communication system of claim 8 wherein the processing system is configured to determine the first location occurs substantially at the time the image was captured.

10. The communication system of claim 8 wherein the processing system is further configured to replace the first location with the second location.

11. The communication system of claim 10 wherein, to replace the first location with the second location, the processing system is configured to remove the first location from the image and embed the second location in the image.

12. The communication system of claim 8 wherein the processing system, to store the first location with the image, is configured to use at least one of the following techniques: embedding the first location in the image, associating the file name of the image with the first location in a relational database, or storing the location as part of the image file name.

13. The communication system of claim 8 wherein the second location is determined using at least one of the group of GPS and assisted GPS.

14. A non-transitory computer readable medium having stored thereon instructions that, when executed by a processing system, direct the processing system to:

receive an image captured by an image capture device;
determine a first location of the image capture device in response to capturing the image;
store the first location in association with the image;
determine a second location of the image capture device subsequent to storing the first location in association with the image, wherein the second location is closer to the location where the image was captured than is the first location; and
store the second location in association with the image.

\* \* \* \* \*